Jan. 23, 1934.    J. K. LENCKE    1,944,249
PROTECTIVE DEVICE FOR HOSE LINES
Filed May 19, 1933    2 Sheets-Sheet 1
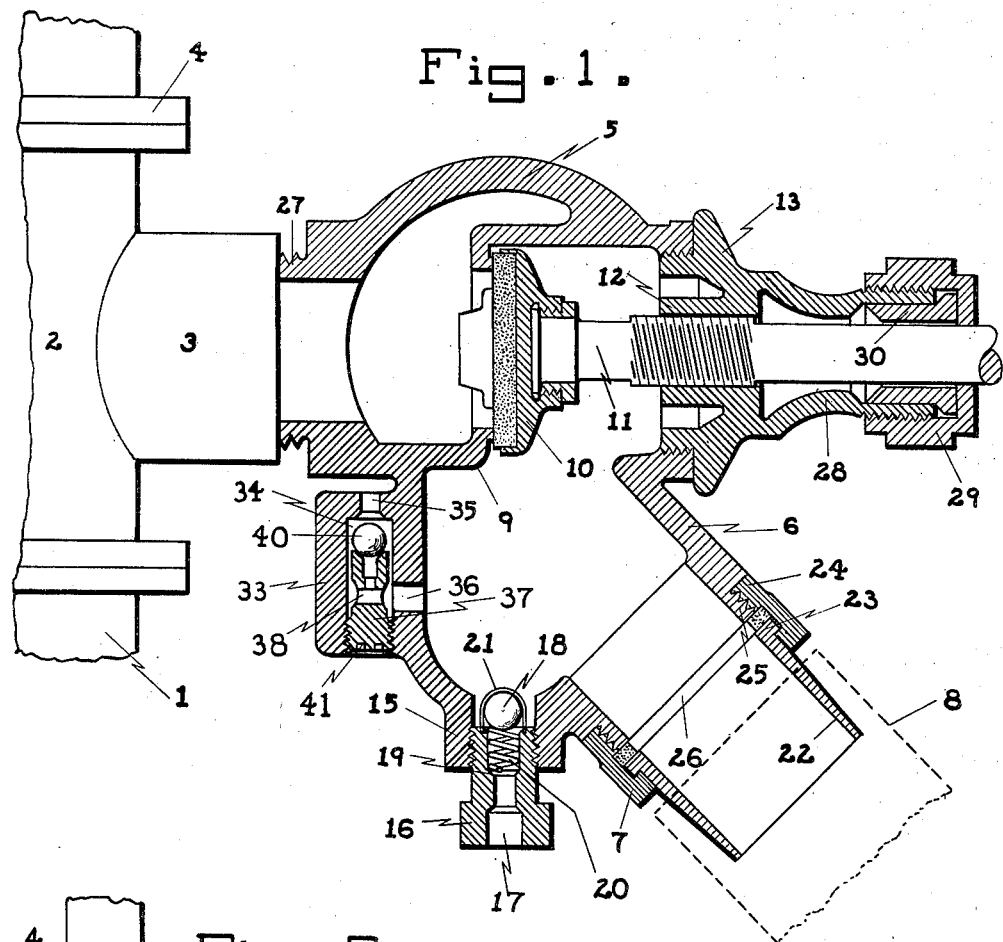
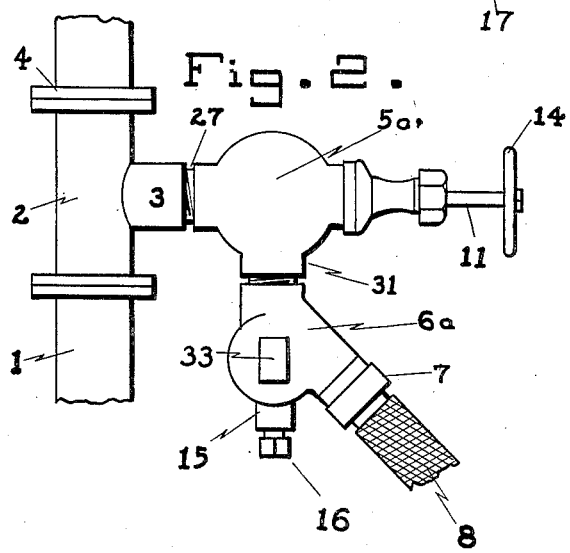
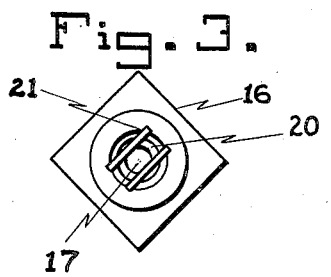
INVENTOR.
John K. Lencke
BY William F. Nickel
ATTORNEY.

Jan. 23, 1934.  J. K. LENCKE  1,944,249
PROTECTIVE DEVICE FOR HOSE LINES
Filed May 19, 1933   2 Sheets-Sheet 2
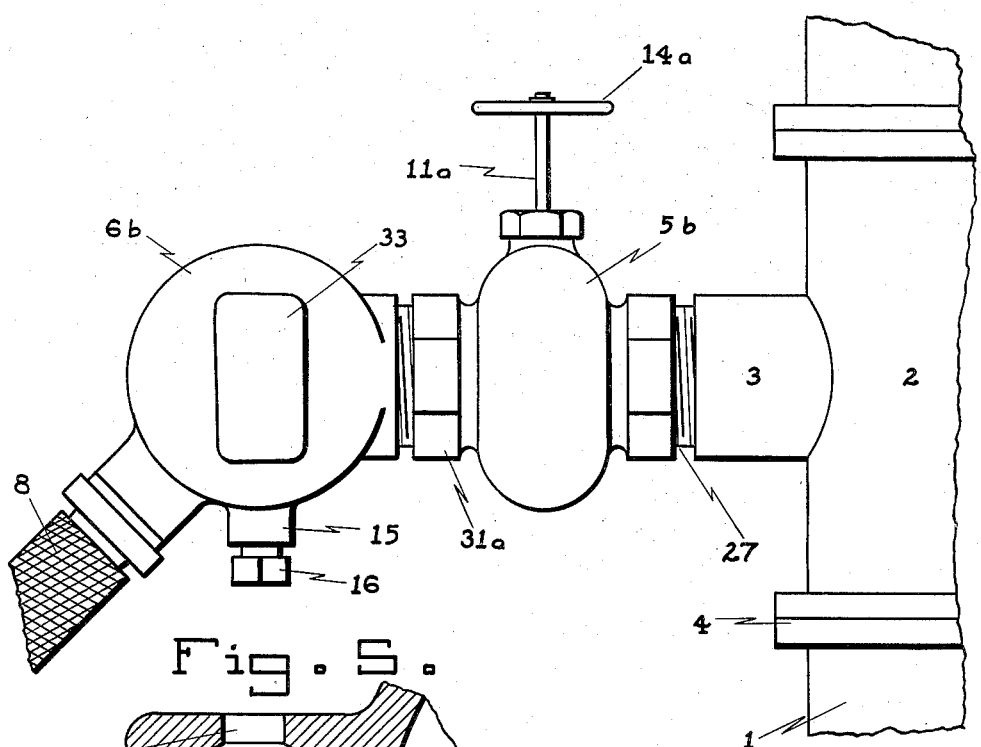
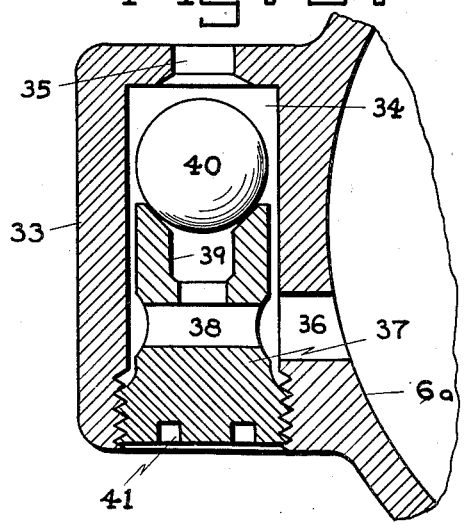
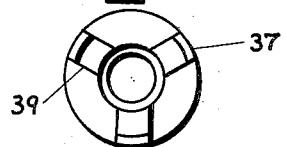
INVENTOR.
John K. Lencke
BY
William F. Nickel
ATTORNEY.

Patented Jan. 23, 1934

1,944,249

UNITED STATES PATENT OFFICE 1,944,249

PROTECTIVE DEVICE FOR HOSE LINES

John K. Lencke, Kingston, N. Y.

Application May 19, 1933. Serial No. 671,893

2 Claims. (Cl. 299—77)

This invention relates to improvements in protective devices for fire hose, and especially to means which is adapted to connect a fire hose to a water supply pipe in a building, and to safeguard the hose against damage when it is not needed for use.

In office buildings and other structures a prescribed length of hose is usually to be found on every floor, connected to one of the main water pipes; with a valve to put the hose in communication with the pipe at a moment's notice. Such an equipment may be idle for long periods without losing any of its efficiency so long as the valve remains tight; but if there should be a leakage of water from the supply pipe past the valve, the water will collect on the inside of the hose, which is collapsed or folded, or on a reel, and eventually cause disintegration of the rubber and fabric. In that event, should a fire break out and the hose be then put into service it is very apt to burst or leak to such an extent as to render it worthless. Hence there will be at hand no immediate means for fighting the fire, which may spread dangerously before other apparatus can reach the scene and the flames be extinguished.

An object of this invention is to render impossible an eventuality of this kind; to neutralize the effect of leakage should a leak occur.

A further object of the invention is to provide for ventilating the interior of my improved protective device and the adjacent portion of the hose through openings that will be automatically closed at once in the event of the hose being needed.

The structure by which the objects and advantages of the invention are realized is disclosed in the following description and the novel features are pointed out in the claims; but of course the right is reserved to make any changes which do not depart from the principle of the invention or exceed the spirit and scope of the claims.

On the drawings:

Fig. 1 shows in section one embodiment of the invention;

Fig. 2 is an elevation of another form;

Fig. 3 represents a detail;

Fig. 4 shows a third modification; and

Figs. 5 and 6 are a section and a top view of another detail.

The same numerals identify the same parts throughout.

The numeral 1 indicates a pipe such as an ordinary stand pipe connected to a water main or other supply. In the line of this pipe at each floor level or at any other interval, is a T-connection 2; the central branch 3 of which is secured to a valve casing 5 having a neck or extension 6 on the lower side for engagement with the coupling 7 for a length of hose indicated at 8. The casing 5 has a transverse web 9 therein. This web or partition has an opening controlled by a valve 10. This valve is mounted on a stem 11 which extends out through a threaded bearing 12 in the closure cap 13 of the casing 5 and carries on its outer end a handwheel 14 (Fig. 2). When this handwheel is turned, the valve can be moved to open or shut position. So long as this valve remains closed no water from the stand pipe 1 can leak into the casing 5; but, if for any reason the valve 10 should permit leakage of water past it, this water will flow into the casing 5 and collect at some point where there is a bend in the hose 8. Due to the presence of salts, acids and other impurities in the water, the action of the water on the inside of the hose will sooner or later weaken or disintegrate the material of which the hose is made. As such leakage and collection of water in the hose will occur without any outside indication of the state of affairs, the defect in the hose will likely not be discovered until a fire breaks out. Then, when the hose is most needed, and one opens the valve 10, the full pressure of the water inside the hose 8 may cause the hose to burst and render it wholly unserviceable.

In the practice of my invention this danger is eliminated by providing the bottom of the outlet neck 6 of the casing 5 with a downwardly extending, internally threaded aperture 15 to receive a screw-plug or bushing 16 having a drain passage 17. This drain passage is controlled by a ball valve 18 which is normally held out of closing position by a spring 19 in the plug 16. This spring seats against a shoulder 20 within the drain passage; and stops 21 limit the outward movement of the valve 18 by the spring 19. Hence if there should be leakage of water past the valve 10 when the hose is not needed, this water will drip into the aperture 15 and enter the drain opening 17, which is uncovered by the valve 18 and be discharged from the lower end of the plug 16. None of it passes to the hose 8, which will therefore be preserved. At the same time the drip of water from the opening 17 will indicate defective condition of the equipment and enable the attendants to repair it. The drain opening 17 is thus kept open by the spring 19 as long as the valve 10 is closed. But if the hose 8 is needed for use and the valve 10 is opened, the pressure of the water flowing into the hose will force the valve 18 against its seat and shut the opening 17, overcoming the force of the spring 19. Hence there will be no leakage of water through the drain opening 17 when a fire breaks out.

The stops 21 may be in the form of two curved wires parallel to each other, secured at their ends to the plug and separated a distance less than the diameter of the ball valve 18, so as to prevent displacement of the valve beyond the point where it can be moved back to close the drain opening 17 by water pressure whenever the valve 10 is unscrewed. See Fig. 3.

The coupling 7 for the hose 8 comprises a tubular metal section or neck 22 to which the end of the hose is made fast in any suitable way. This neck has an external flange 23 at one end and surrounding said end is a coupling ring 24 which has an inside shoulder to engage the flange 23. The ring 24 is threaded inside to screw upon a reduced threaded portion 25 which forms the open discharge end of the neck 6. Between the extremity of this neck and the section 22 is a packing ring or gasket 26. When the coupling ring 24 is tightened the section 22 is clamped securely against the gasket 26. The casing 5 will normally be supported in such position that the extension 6 is below the same, and the stem 11 is substantially horizontal. One side of the casing has the open threaded end 27 which is screwed into the central branch 3 of the T-connection 2 and the cap 13 is screwed into a similar opening at the other end of the casing. This cap has a projection 28 threaded to receive a closure 29 through which the stem 11 passes. In this closure is a gland 30, and suitable packing material may be placed within the projection 28 to surround the stem 11. These features are of the usual construction and form no part of the invention.

It will be seen that in the working position of the device the seat engaged by the valve 10, which may be of the usual design, is vertical and the valve 18 is directly below the plane of the seat; so that any leakage drops down into the aperture 15. The outlet neck 6 is inclined and to one side of the vertical plane of the seat for the valve 10 and the drain passage or opening 17. Hence no leakage can drip into the hose 8 and the inclination of the outlet neck 6 enables the hose to be connected to the casing in the most advantageous position.

In the modification shown in Fig. 2 the valve casing 5a has an outlet opening 31 on its bottom and this outlet is threaded to receive an extension 6a to which the hose is connected and in which the valve-plug 16 is screwed at the bottom. The extension 6a carries the valve-plug 16 in the plane of the seat of the valve as before. The device shown in Fig. 2 enables me to attach my protective device to an ordinary valve casing which is indicated at 5a. Such casings are now in extensive use and the hose is attached to the extremity of the outlet 31. I merely disconnect the hose from the outlet 31 and on the threaded end of this outlet I screw the extension 6a and then couple the hose to the outlet of the latter.

From the foregoing description it will be seen that my invention is well adapted to serve its intended purpose and eliminate all risk of the hose becoming rotted by inside leakage. Any water that may get past the valve 10 when the hose is not in use is not only prevented from entering the hose but is permitted to flow out through the drain opening 17, and thus gives an indication to the attendant that the valve 10 is either loose and should be screwed up or is defective and should be repaired.

My invention also provides for additional protection of the hose by ventilating the interior of the extension 6 and 6a so as to keep this part of the casing and the adjacent portion of the hose dry and prevent the formation in the hose of mold, which would injure the hose the same as the leakage of water. I gain this result by providing an outlet in the extension 6 or 6a near the top so that air can circulate into and out of this extension; and the circulation of the air will not permit any mold to form in the hose 8.

For this purpose the extension 6 and 6a are provided in the side above the aperture 15 with an enlargement 33 having a bore or chamber 34 with an air vent 35 at the top. This chamber communicates with the interior of the extension or outlet neck through an opening 36. The lower end of the chamber is threaded to receive a plug 37. The inner portion of this plug is of reduced diameter so that it does not fill the chamber 34 and in the line with the opening 36 it has a transverse passage 38. At its inner extremity the plug 37 terminates in three prongs 39 to support a ball valve 40 just below the air outlet 35. These prongs are separated from one another and normally there is a free passage from the interior of the extension through the hole 36, the bore 38 and around and between the prongs 39 through the vent 35.

The plug 37 and the chamber 34 in the enlargement 33 will be maintained in vertical position and as long as the valve 10, for example, is kept shut, air can flow through the drain passage 17 into the extension or outlet neck and the adjacent portion of the hose and out past the ball valve 40 and vent 35. Thus not only is any leakage that might take place past the main valve permitted to drain out through the plug 16, but also the interior of the extension or outlet neck and the adjacent part of the hose is ventilated and the formation of mold, inside the device and the hose attached thereto, prevented; because air can enter through the plug 16 and pass out through the chamber 34, the valve 40 being held open by gravity. When the hose is needed for use, however, and the water supply turned on, the pressure of the water will shut not only the valve 18 but also the valve 40 by forcing the valve 40 upward against the counterbored inner end of the vent 35. Hence all of the water will be discharged through the hose 8.

The construction of the enlargement 33 and plug 37 is fully shown in Figs. 5 and 6.

Fig. 4 shows how the invention may be employed in connection with a gate valve. In this construction the casing 5b of the valve is attached to the branch 3 and the stem 11a projects out of the top of the casing 5b and carries a handwheel 14a. The outlet neck 31a of the casing is screw-threaded and receives an extension 6b, this extension having a discharge opening so that the hose 8 can be secured thereto at an incline in the same manner as shown in Figs. 1 and 2. In the lower part of the extension 6b is an opening so that the drain-plug 16 can be screwed in place, and at the side of this extension is an enlargement 33 with passages and valve therein for ventilation as above described.

It will be seen that in the form shown in Figs. 1 and 2 the aperture 15 is so formed that the interior surface of the extension 6 and 6a is depressed and is lower than the lowest part of the edge of the outlet of the extension into the hose 8. Similarly in the construction shown in Fig. 4 the drain-plug is screwed into the lowest part of the extension 6b so that leakage from the valve in the casing 5b will reach the plug first before it arrives at the outlet neck opening into the hose 8.

Having described the invention, what is claimed is:

1. The combination with a water supply pipe of a casing connected to the exterior thereof, said casing having a valve therein and carrying means below said valve to provide an opening for leakage at the valve to drain to the exterior of the casing, and to enable a hose to be connected to the casing to one side of said valve and said opening so that water leaking past said valve does not drip into said hose, said means comprising another valve normally open and capable of being closed by the pressure of the water in the casing when the first valve is opened, and means comprising a normally open vent and another valve also capable of being closed by the pressure of the water in the casing when the first valve is opened to obstruct said vent, whereby as long as the first valve is shut ventilation is provided for a portion of the interior of said casing and the hose attached thereto.

2. A casing to be connected to a water supply pipe, said casing having a valve therein and carrying means to provide an opening for leakage at the valve to drain to the exterior of the casing and to enable a hose to be connected to the casing in such position that water leaking past said valve does not drip into said hose, said means comprising another valve normally open and capable of being closed by pressure in the casing when the first valve is open, and means carried by the casing and comprising a normally open vent and a valve also capable of being closed by pressure in the casing when the first valve is open to obstruct said vent and prevent the flow of water thru it, whereby as long as the first valve is shut ventilation is provided for a portion of the interior of the casing and the hose attached thereto.

JOHN K. LENCKE.